(12) United States Patent
Fischer

(10) Patent No.: US 6,561,773 B1
(45) Date of Patent: May 13, 2003

(54) FUEL SUPPLY PUMP FOR A VEHICLE AND A FUEL SUPPLY SYSTEM EQUIPPED WITH SAID FUEL SUPPLY PUMP

(75) Inventor: Gregor Fischer, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 37 days.

(21) Appl. No.: 09/868,247

(22) PCT Filed: Sep. 13, 2000

(86) PCT No.: PCT/EP00/08918

§ 371 (c)(1),
(2), (4) Date: Jun. 15, 2001

(87) PCT Pub. No.: WO01/29394

PCT Pub. Date: Apr. 26, 2001

(30) Foreign Application Priority Data

Oct. 16, 1999 (DE) .......................................... 199 49 902

(51) Int. Cl.⁷ .......................... F04B 17/00; F04B 49/00; F02M 37/04
(52) U.S. Cl. .................... 417/366; 417/307; 417/423.3; 123/497
(58) Field of Search ................................ 417/366, 307, 417/423.3; 123/497, 41.31

(56) References Cited

U.S. PATENT DOCUMENTS

| | | | |
|---|---|---|---|
| 3,477,238 A | 11/1969 | Race | 62/3 |
| 3,734,292 A | 5/1973 | Bell | 210/172 |
| 4,181,473 A | 1/1980 | Ina | 417/365 |
| 4,778,354 A | * 10/1988 | Idei | 417/366 |
| 4,934,907 A | 6/1990 | Kröner | 417/417 |
| 5,630,399 A | * 5/1997 | Nomura et al. | 123/467 |
| 5,888,053 A | * 3/1999 | Kobayashi et al. | 417/244 |
| 6,142,126 A | * 11/2000 | Kanamaru | 123/509 |

FOREIGN PATENT DOCUMENTS

| | | |
|---|---|---|
| DE | 37 33 984 A1 | 6/1989 |
| DE | 43 44 777 C2 | 6/1995 |
| DE | 691 23 457 T2 | 6/1997 |
| GB | 1358135 | 6/1974 |
| JP | 62-243956 | 10/1987 |

OTHER PUBLICATIONS

International Search Report (PCT/ISA/210) dated Dec. 8, 2000.
German Search Report dated Jun. 5, 2000.

\* cited by examiner

Primary Examiner—Charles G. Freay
Assistant Examiner—Michael K. Gray
(74) Attorney, Agent, or Firm—Crowell & Moring LLP

(57) ABSTRACT

An internal housing is surrounded by an external housing, forming an external space. A total quantity of fuel, pumped by the fuel feed pump into the external housing is divided in such a manner into two subquantities of fuel such that the subquantity of fuel, required by a motor, flows out of the fuel feed pump after flowing through the external space and an internal pump housing space. The other subquantity of fuel flows to a pressure regulator without flowing through the external and internal spaces of the pump.

12 Claims, 1 Drawing Sheet

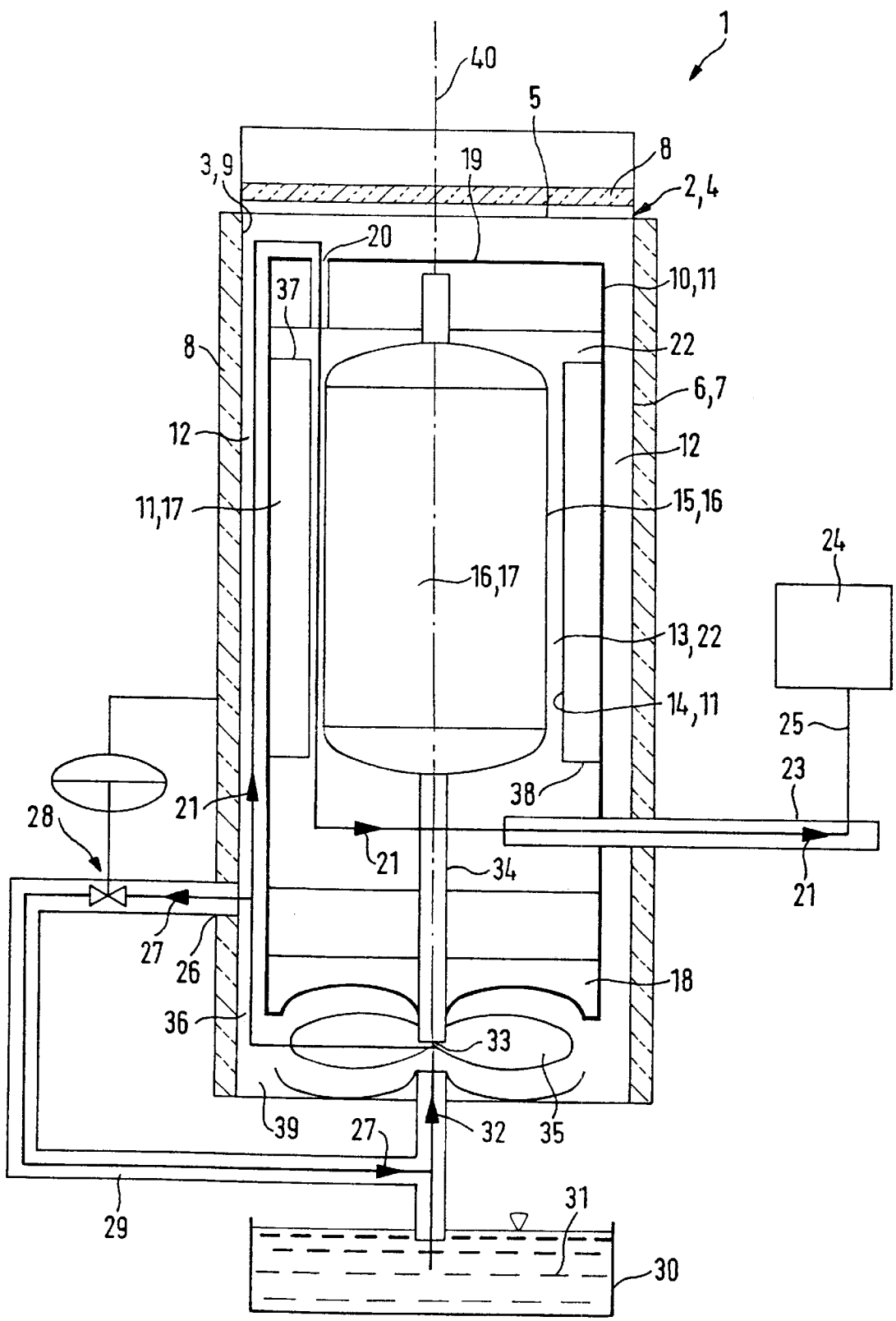

FUEL SUPPLY PUMP FOR A VEHICLE AND A FUEL SUPPLY SYSTEM EQUIPPED WITH SAID FUEL SUPPLY PUMP

BACKGROUND AND SUMMARY OF THE INVENTION

The invention relates to a fuel feed pump and a fuel feed system which is provided with a fuel feed pump for a motor vehicle, with a housing, in which a stator with a rotor of an electric drive motor is disposed, wherein between an inside wall of the stator and an outside wall of the rotor there is an internal space.

The German Patent Document DE 43 44 777 C2 already discloses a fuel supply system for a motor vehicle, where the fuel tank, the flow line system and the injection strip are insulated so as to be protected against loss of heat. However, what is not considered in this prior art fuel supply system is that the fuel feed pump also dissipates heat to the fuel, surrounding the fuel feed pump.

The object of the invention is to provide a fuel feed pump for a motor vehicle and a fuel feed system, provided with such a fuel feed pump, wherein the heating of a fuel, located in the fuel feed system, is reduced.

This problem, associated with the fuel feed pump of the invention, is solved by a fuel feed pump wherein the housing of the electric drive motor is surrounded by an external housing, forming an external space; wherein a total quantity of fuel, pumped by the fuel feed pump into the external housing, is divided in such a manner into two subquantities of fuel that the subquantity of fuel, required by a motor flows out of the fuel feed pump after flowing through the external space and the internal space; and wherein the other subquantity of fuel flows to a pressure regulator.

This problem, associated with the fuel feed system further includes a fuel tank from which the fuel feed pump pumps fuel to a motor and simultaneously to the pressure regulator, and that the subquantity of fuel, flowing through the fuel pressure regulator, flows back to the fuel tank.

The advantage of the fuel feed pump, according to the invention, is that the only amount of fuel that still flows completely through an interior of a housing of the fuel feed pump is that amount of fuel that is fed to an internal combustion engine. A subquantity of fuel is diverted from the housing of the fuel feed pump to a pressure regulator. In the fuel feed system, according to the invention, the diverted fuel flows from the pressure regulator back into a fuel tank of the fuel feed system.

The interior of the inventive housing of the fuel feed pump is constructed in such a manner that the fuel, fed to the motor, absorbs, first of all, the waste heat of the stator of the electric motor and then cools the outer surface of the rotor. By feeding the cold fuel to the surface of the electric drive motor it is guaranteed that even the outer surface of the housing of the inventive fuel feed pump will reach only a low temperature; and thus only very little heat can be dissipated by way of the surface of the housing of the fuel feed pump to the fuel, surrounding the fuel feed pump.

It is advantageous for the surface of the housing of the inventive fuel feed pump to be thermally insulated. Thus, the heating of the fuel of the inventive fuel feed system is reduced. By reducing the heat introduced into the inventive fuel feed system, the temperature of the fuel in the fuel tank remains lower. The result is simultaneously a lower rate of gas generation and thus reduced emission.

BRIEF DESCRIPTION OF THE DRAWING

The single drawing FIGURE is a schematic view of a fuel feed system including a fuel feed pump, constructed according to a preferred embodiment of the invention.

DETAILED DESCRIPTION OF THE DRAWING

One embodiment of the invention is described below as an example with reference to the single drawing. Said drawing is a schematic of a fuel feed system 1 with a fuel feed pump 2, depicted as a longitudinal section. The fuel feed pump 2, shown in the figure, is surrounded with an insulating layer 8 on an outer surface 4 of an upper face 5 and on an outer surface 6 of a jacket 7 of an external housing 3.

Between an inside wall 9 of the rotationally symmetrical, external housing 3 and an outside wall 10 of a stator 11 of an electric drive motor 17 there is an external space 12, where the outside wall 10 in the illustrated embodiment is a part of a wall of an internal housing 18. The space 12 exhibits at least one inlet opening 36 below a bottom end 38 of the stator 11. There is an internal space 13 between an inside wall 14 of the stator 11 and an outside wall 15 of a rotor 16 of the electric drive motor 17.

The rotor 16 can be rotated around an axis 40. The internal housing 18 envelops the rotor 16 completely. On one bottom end 33 of the rotor shaft 34 there is a pump unit 35, e.g. in the form of blades or the like, which can rotate in a chamber 39, which is designed below the internal housing 18 and belongs to the external housing 3.

In the illustrated embodiment this internal housing 18 exhibits on its upper face 19 above an upper end 37 of the stator 11 an inlet opening 20, through which a fuel flow, illustrated by an arrow 21, or a subquantity 21 of fuel can flow into an interior 22 and thus into an internal space 13. The internal housing 18 is provided with an outlet pipe 23 or the like, through which the fuel flow 21 can flow through lines 25 to a motor 24.

The external housing 3 exhibits another outlet opening 26, through which a subquantity of fuel, illustrated by an arrow 27, can flow to a pressure regulator 28. The subquantity 27 flows from the pressure regulator 28 through a line 29 back to a fuel tank 30. From the fuel tank 30 the fuel feed pump 2 conveys a total quantity of fuel, illustrated with an arrow 32, from the fuel tank 30, filled with fuel 31.

What is claimed is:

1. Fuel feed pump for a motor vehicle, with a housing, in which a stator with a rotor of an electric drive motor is disposed, wherein between an inside wall of the stator and an outside wall of the rotor there is an internal space, wherein the housing of the electric drive motor is surrounded by an external housing, forming an external space; wherein a total quantity of fuel, pumped by the fuel feed pump into the external housing, is divided so that a first subquantity of fuel, required by a motor, flows out of the fuel feed pump after flowing through the external space and the internal space and a second subquantity of fuel flows to a pressure regulator without flowing through said internal space.

2. Fuel feed pump, as claimed in claim 1, wherein the external space exhibits at least one inlet opening, through which the total quantity of fuel, conveyed by the fuel feed pump, can flow into the external space; wherein there is at least one outlet opening in the external housing, through which the second subquantity of fuel can flow to the pressure regulator; and wherein the housing exhibits at least one inlet opening above an upper end of the outside wall of the stator, through which, after flowing through the internal space, the first subquantity of fuel, required by the motor, can flow to at least one outlet pipe or the like, which is designed below a bottom end of the stator.

3. Fuel feed pump, as claimed in claim 1, wherein at least the jacket of the external housing is surrounded by a heat insulating layer.

4. Fuel feed pump as claimed in claim 2, wherein at least the jacket of the external housing is surrounded by a heat insulating layer.

5. Fuel feed pump for a motor vehicle, comprising:

a drive motor housing, an electric drive motor stator and rotor disposed in the housing with an internal space formed between an inside wall of the stator and an outside wall of the rotor, an external housing surrounding the drive motor housing with an external space formed between the external housing and drive motor housing, said fuel feed pump being operable to pump fuel into the external space, and a fuel divider arrangement operable to divide the fuel pumped into the external space into a first fuel portion which flows through the internal and external spaces to a fuel consuming motor and a second fuel portion which flows, without flowing through the internal space, to a pressure regulator at an upstream end portion of the external space.

6. Fuel feed pump according to claim 5, wherein the external space exhibits at least one inlet opening, through which a total quantity of fuel, conveyed by the fuel feed pump, can flow into the external space;

wherein the fuel divider arrangement is defined by at least one outlet opening in the external housing, through which the second fuel portion can flow to the pressure regulator; and wherein the housing exhibits at least one inlet opening above an upper end of the outside wall of the stator, through which, after flowing through the internal space, the first fuel portion, required by the motor, can flow to at least one outlet pipe or the like, which is designed below a bottom end of the stator.

7. Fuel feed pump according to claim 5, wherein at least the jacket of the external housing is surrounded by a heat insulating layer.

8. Fuel feed pump according to claim 6, wherein at least the jacket of the external housing is surrounded by a heat insulating layer.

9. A fuel feed system for a motor vehicle motor having a fuel tank, and a fuel feed pump operable to pump fuel from the fuel tank to a vehicle motor, said fuel feed pump comprising:

a drive motor housing, an electric drive motor stator and rotor disposed in the housing with an internal space formed between an inside wall of the stator and an outside wall of the rotor, an external housing surrounding the drive motor housing with an external space formed between the external housing and drive motor housing, said fuel feed pump being operable to pump fuel into the external space, and a fuel divider arrangement operable to divide the fuel pumped into the external space into a first fuel portion which flows through the internal and external spaces to a fuel consuming motor and a second fuel portion which flows, without flowing through the internal space, to a pressure regulator at an upstream end portion of the external space, and wherein the second fuel portion is fed back to the fuel tank.

10. A fuel feed system according to claim 9, wherein the external space exhibits at least one inlet opening, through which the total quantity of fuel, conveyed by the fuel feed pump, can flow into the external space;

wherein the fuel divider arrangement is defined by at least one outlet opening in the external housing, through which the second fuel portion can flow to the pressure regulator; and wherein the housing exhibits at least one inlet opening above an upper end of the outside wall of the stator, through which, after flowing through the internal space, the first fuel portion, required by the motor, can flow to at least one outlet pipe or the like, which is designed below a bottom end of the stator.

11. Fuel feed pump according to claim 9, wherein at least the jacket of the external housing is surrounded by a heat insulating layer.

12. Fuel feed pump according to claim 10, wherein at least the jacket of the external housing is surrounding by a heat insulating layer.

* * * * *